United States Patent
Kim et al.

(10) Patent No.: US 9,513,796 B2
(45) Date of Patent: Dec. 6, 2016

(54) METHOD AND DEVICE FOR CONTROLLING CONTENTS USING TOUCH, RECORDING MEDIUM THEREFOR, AND USER TERMINAL HAVING SAME

(75) Inventors: Jae-Jeung Kim, Daejeon (KR); Sang-Tae Kim, Daejeon (KR); Ho-Won Lee, Daejeon (KR); Dong-Ho Cho, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 146 days.

(21) Appl. No.: 13/702,837

(22) PCT Filed: Dec. 20, 2011

(86) PCT No.: PCT/KR2011/009874
§ 371 (c)(1),
(2), (4) Date: Dec. 7, 2012

(87) PCT Pub. No.: WO2012/118271
PCT Pub. Date: Sep. 7, 2012

(65) Prior Publication Data
US 2013/0082972 A1    Apr. 4, 2013

(30) Foreign Application Priority Data
Mar. 3, 2011  (KR) .................. 10-2011-0018855

(51) Int. Cl.
*G06F 3/041* (2006.01)
*G06F 3/048* (2013.01)
(Continued)

(52) U.S. Cl.
CPC ........... *G06F 3/0488* (2013.01); *G06F 3/0484* (2013.01); *G06F 3/04886* (2013.01)

(58) Field of Classification Search
CPC .................. G06F 3/041–3/044; G06F 3/048; G06F 3/0485; G06F 3/0488; G06F 3/04845; G06F 3/04833; G06F 2203/04806; G06F 2203/04808
(Continued)

(56) References Cited

U.S. PATENT DOCUMENTS

2009/0210810 A1* 8/2009 Ryu .................. G06F 3/0485
715/769
2010/0100841 A1* 4/2010 Shin et al. .................... 715/784
(Continued)

FOREIGN PATENT DOCUMENTS

JP    2000-242390 A    8/2000
KR    10-2010-0008696 A    1/2010
(Continued)

OTHER PUBLICATIONS

International Search Report mailed Jul. 25, 2012 for PCT/KR2011/009874.
(Continued)

*Primary Examiner* — Ilana Spar
*Assistant Examiner* — Nguyen H Truong

(57) ABSTRACT

The present invention provides a method and a device for controlling contents of a user terminal having a touch screen, a recording medium therefor, and a user terminal having the same. The present invention relates to a method for controlling the contents of a user terminal having a touch screen, wherein, when a touch is detected on the touch screen while executing contents conversion, a part of the contents gets fixed on the basis of the detected location of the touch. Therefore, two or more contents can be easily compared using the fixed contents region as reference contents.

15 Claims, 9 Drawing Sheets

(51) Int. Cl.
    *G06F 3/0488*     (2013.01)
    *G06F 3/0484*     (2013.01)
(58) Field of Classification Search
    USPC .................................................. 345/156–184
    See application file for complete search history.

(56) References Cited

U.S. PATENT DOCUMENTS

| | | | |
|---|---|---|---|
| 2011/0187750 A1* | 8/2011 | Ko ........................... | G09G 5/00 345/661 |
| 2011/0270600 A1* | 11/2011 | Bose et al. ...................... | 703/17 |
| 2012/0017177 A1* | 1/2012 | Kim .................... | G06F 3/04886 715/828 |
| 2012/0019563 A1* | 1/2012 | Misawa et al. ............... | 345/661 |

FOREIGN PATENT DOCUMENTS

| | | |
|---|---|---|
| KR | 10-2010-0018883 A | 2/2010 |
| KR | 10-2010-0021189 A | 2/2010 |
| WO | WO 2010074310 A1 * 7/2010 | ............. G06F 3/048 |

OTHER PUBLICATIONS

International Search Report mailed Jul. 26, 2012 for PCT/KR2011/009874.

\* cited by examiner

METHOD AND DEVICE FOR CONTROLLING CONTENTS USING TOUCH, RECORDING MEDIUM THEREFOR, AND USER TERMINAL HAVING SAME

This application claims the priority of Korean Patent Application No. 10-2011-0018855, filed on Mar. 3, 2011 in the KIPO (Korean Intellectual Property Office), the disclosure of which is incorporated herein entirely by reference. Further, this application is the National Stage application of International Application No. PCT/KR2011/009874, filed Dec. 20, 2011, which designates the United States and was published in Korean. Each of these applications is hereby incorporated by reference in their entirety into the present application.

TECHNICAL FIELD

The present invention relates to a method and a device for controlling contents using touch, a recording medium therefor, and a user terminal having the same, and more particularly, to a method and a device for controlling contents using multi-touch, a recording medium therefor, and a user terminal having the same, in which a plurality of contents are easily controlled by discriminating fixed contents and unfixed contents with touch.

BACKGROUND ART

A terminal or a user terminal may be classified into a mobile or portable terminal and a stationary terminal according to whether or not it is movable. The mobile terminal may be classified into a hand held terminal and a vehicle mount terminal according to whether or not a user can directly carry it. For example, the user terminal described above is embodied by a multimedia player type provided with complex functions such as taking a picture or a movie, playing music or movie files, gaming, and receiving broadcasting, according to diversification of functions. A terminal which can embody a file viewer function of displaying a web page or viewing the content of text files with access to wireless internet is disclosed.

However, when the contents are displayed by ones through such a terminal, it is difficult for the user to compare a plurality of contents due to a restricted size of the terminal. Differently from this, when the plurality of contents are compared through a plurality of windows, there is discomfort that a plurality of separate windows have to be activated. In addition, each of the plurality of contents follows the same control manner, and thus it is difficult to perform content comparison of comparing any one with the other.

DISCLOSURE OF THE INVENTION

Technical Problem

The present invention is directed to providing a method and a device for controlling contents, in which it is possible to efficiently fix specific contents and to convert unfixed contents area into the other contents, in comparison or the like of contents.

Technical Solution

According to an aspect of the invention, there is provided a method for controlling contents of a user terminal provided with a touch screen, wherein when touch is detected on the touch screen at the time of contents conversion, a part of the contents is fixed on the basis of the detected touch position.

In the aspect, the converted contents may be displayed on the full touch screen according to release of the touch.

In the aspect, the touch state of the touch may be kept at the time of the contents conversion.

According to an aspect of the invention, there is provided a method for controlling contents of a user terminal provided with a touch screen on which contents are sequentially displayed, the method including: detecting first touch on a touch screen on which first contents are displayed; detecting second touch in a touch screen area other than the detected first touch position; and converting the first contents into second contents by a second touch gesture from the second touch, wherein a predetermined area of the first contents is not converted by the first touch with the touch state kept in the contents conversion based on the second touch.

In the aspect, the first touch may be one or more.

In the aspect, the predetermined area of the contents which are not converted may include the first touch detection position.

In the aspect, a boundary of the predetermined area of the contents which are not converted may be determined on the basis of the touch screen position where the first touch is detected.

In the aspect, the first touch may be movable by a user, and a size of the predetermined area of the contents which are not converted may be variable.

In the aspect, the contents converted by the second touch gesture may be fully displayed on the touch screen according to release of the first touch.

In the aspect, the contents fixed by the first touch gesture may be fully displayed on the touch screen according to release of the second touch.

According to an aspect of the invention, there is provided a device for controlling contents of a user terminal, including: a touch screen on which the contents are displayed; a touch detecting unit that detects touch on the touch screen and a position thereof; and a control unit that converts the contents displayed on the touch screen according to a predetermined event, wherein the control unit fixes a part of the contents on the basis of the detected touch position when touch is detected on the touch screen at the time of contents conversion.

In the aspect, the predetermined event may be a touch-dragging gesture.

In the aspect, the touch detecting unit may simultaneously detect two or more of touch on the touch screen.

Advantageous Effects

In the method for controlling contents according to the invention, a contents area which is not converted by touch is determined, the touch is determined at the time of contents conversion, and a touch state thereof is kept. Particularly, in multi-touch in which two or more of touch are performed, a contents area fixed on the basis of any one touch is set, and a contents area other than the contents area fixed according to a touch gesture from the other touch is converted. Accordingly, it is easy to compare two or more contents, in which the fixed contents area is reference contents.

MODE FOR CARRYING OUT THE INVENTION

Figure 1:
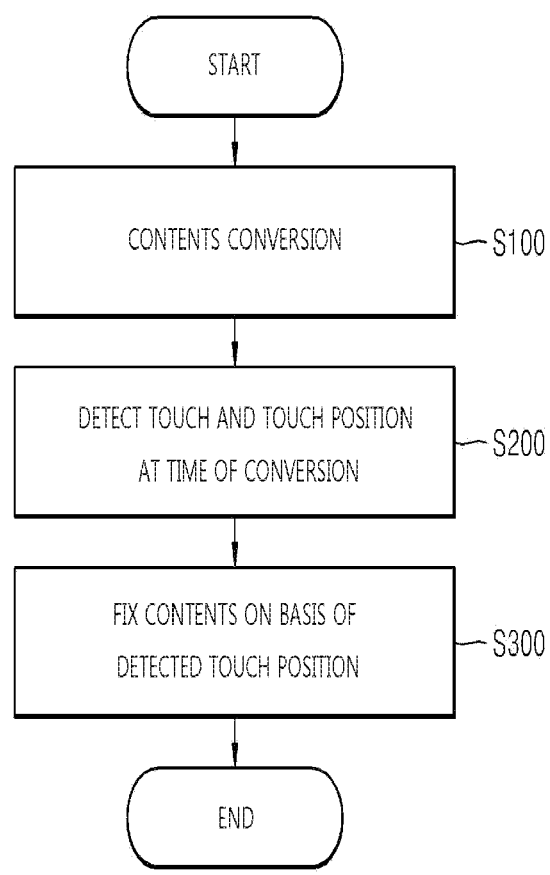
FIG. 1 is a flowchart illustrating a method for controlling contents according to an embodiment of the invention.

To sufficiently understand the invention, an advantage of an operation of the invention, an object achieved by embodiments of the invention, the accompanying drawings and the content described in the accompanying drawings exemplifying preferred embodiments of the invention has to be referred.

Hereinafter, the preferred embodiments of the invention will be described with reference to the accompanying drawings to describe the invention in detail. However, the invention may be embodied in various different forms, and is not limited to the described embodiments. Parts unrelated to the description are omitted to clearly describe the invention, and the same reference numerals and signs of the drawings indicate the same members.

In the whole specification, when any part "includes" any constituent element, it means that the other constituent element is not excluded but may further include the other constituent elements as long as particularly there is no opponent description. In addition, each of terms such as "~unit", "~er", "module", "block", and the like described in the specification means a unit that processes at least one function or operation, which may be embodied by hardware, software, or combination of hardware and software.

The inventor pays attention to the fact that, when contents displayed on a user terminal are converted, it is very difficult to fix only a desired part of contents. That is, according to the related art, two contents are compared by a method of performing separate bookmark in desired contents and then returning it again or a method of activating a separate window to display new contents. However, it is difficult to allow a user to selectively fix a desired part of contents and to compare the fixed contents part with the new contents, even by any method.

Accordingly, the invention is to keep the previously displayed contents in a fixed state on the basis of predetermined spots where the touch state is kept at the time of contents conversion by utilizing characteristics of the touch screen. That is, when contents conversion such as page tuning happens, the user determines an area to be still desired on a display among the previous contents by a touch gesture, and continuously keeps the touch state at the time of conversion. Accordingly, a content fixed area is determined on the basis of the spot where the touch state is kept, and the other area is freely converted by various events (for example, dragging and the like).

FIG. 1 is a flowchart illustrating a method for controlling contents according to an embodiment of the invention.

Referring to FIG. 1, first, contents conversion is performed (S100). The contents conversion is a process of changing contents displayed on a display to the other contents, and conversion of web pages, and turning of document files, and the like correspond to such contents conversion. The contents conversion in S100 may be performed by a separate click gesture or the like as well as a touch gesture on the touch screen, and a start event for contents conversion is not limited to a specific example. It is detected whether or not touch is detected on the touch screen at the time of contents conversion (S200), and if touch is detected at a specific position, a part of contents is fixed on the basis of the detected touch position (S300). Herein, the contents fixation means that the contents of the partial area determined on the basis of the detected touch position at the time of conversion in spite of the contents conversion event are not converted, and the previous contents are still displayed. Accordingly, a boundary between the display area where the contents are converted and the area where the contents are not converted becomes a touch position where the touch state is kept at the time of conversion, and the touch position may be freely moved at the time of conversion or even after conversion.

In addition, in the embodiment of the invention, at the time of contents conversion, the whole of the converted contents is displayed on the full touch screen according to detachment of the contact state between the kept touch input means (for example, a finger) and the touch screen, that is, touch release. Alternatively, on the contrary, according to release of the touch on the non-converted contents, the whole of the non-converted, that is, fixed contents may be displayed on the touch screen again.

Figure 2:
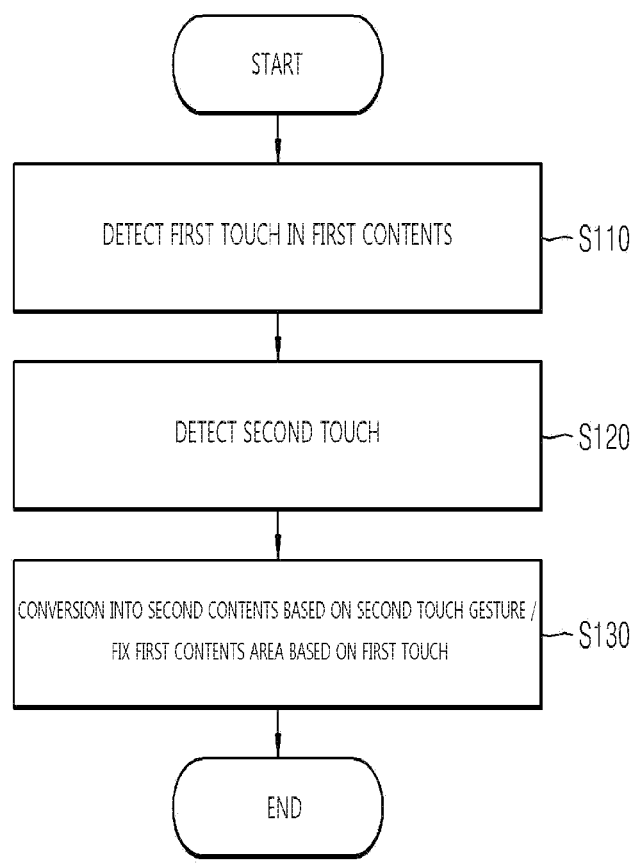
FIG. 2 is a flowchart illustrating a method for controlling contents according to an embodiment of the invention.

FIG. 2 is a flowchart illustrating a method for controlling contents according to an embodiment of the invention. In FIG. 2, the event for contents conversion is a touch gesture performed after touch, and more specifically, a dragging gesture.

Referring to FIG. 2, first, first touch is detected on a touch screen on which first contents are displayed (S110). The first touch may be performed at an arbitrary spot of the contents area displayed on the touch screen of the user terminal, and may be one, two or more of multi-touch. In the specification, the touch of determining the fixed contents area is classified into the first touch, the touch of converting the displayed contents is classified into the second touch, and the first touch and the second touch do not mean the number of touch. In addition, the contents displayed on the touch screen in an embodiment of the invention are contents which may be sequentially displayed, and may be an electronic book page, a photograph, a web page, and the like.

Then, the second touch is detected at the touch screen area other than the detected first touch position (S120). As described above, the second touch is touch discriminated from the touch of determining the fixed contents area. Then, the first contents displayed on the touch screen by the touch gesture (indicated by the second touch gesture for convenience) performed from the second touch are converted into the second contents (S130). In this case, the touch state of the first touch is kept in the contents conversion process based on the second touch, and a predetermined area of the first contents is not converted by the first touch, the touch state of which is kept. That is, differently from the contents (the second contents) converted in the invention, the predetermined area (the fixed area) of the contents (the first contents) before conversion is not converted and is fixed on the touch screen, and the fixed area of the first contents is determined by the first touch. Accordingly, in spite of the second touch gesture, the predetermined area of the contents which are not converted includes the position where the first touch is detected, and preferably, the boundary of the predetermined area of the non-converted contents is set on the basis of the touch screen position where the first touch is detected.

In addition, the first touch may be moved by the user even after conversion, and the size of the predetermined area of the non-converted contents (the first contents) is variable.

Furthermore, in an embodiment of the invention, a method of displaying the contents converted by the second touch gesture on the full touch screen according to release of the first touch, or a method of displaying the contents fixed by the first touch gesture on the full touch screen according to release of the second touch is proposed. However, the touch states of the other second touch and first touch may be kept at the time of the release of the first touch or the second touch.

Hereinafter, the invention will be described in detail with reference to preferred embodiments.

FIG. 3 to FIG. 6 are diagrams illustrating a method for controlling contents according to an embodiment of the invention.

Figure 3:
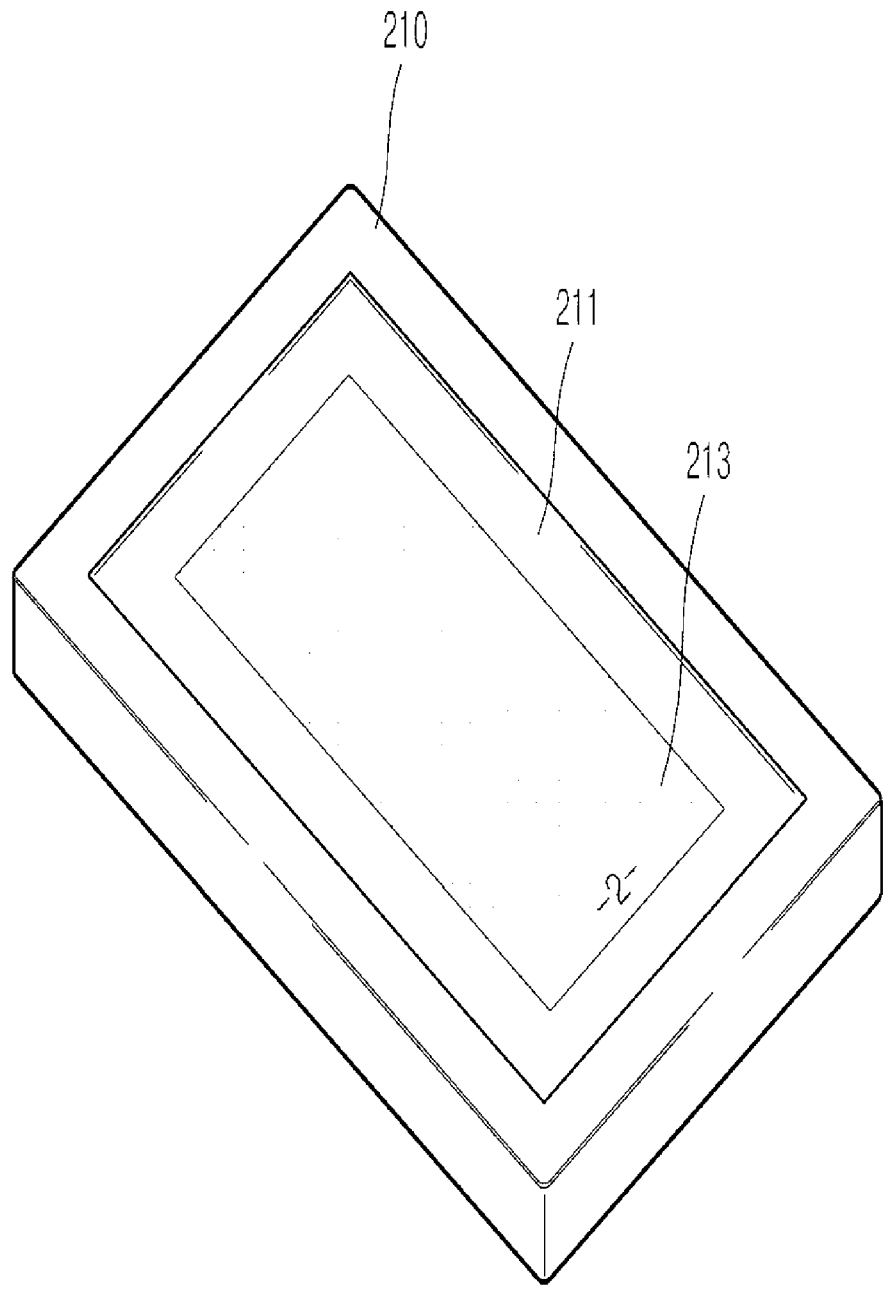
FIG. 3 to FIG. 6 are diagrams illustrating a method for controlling contents according to an embodiment of the invention.

Referring to FIG. 3, a user terminal 210 such as a mobile phone or a tablet PC is show. The user terminal 210 is provided with a touch screen display 211, and the touch screen 211 is a multi-touch screen capable of simultaneously detecting at least two or more of touch. The contents 213 such as an electronic book are displayed on the touch screen 211

In FIG. 3, the contents 213 are formed of a plurality of items, the plurality of contents (they are pages of the book in FIG. 3) are a type covered with each other, and the contents displayed according to a predetermined event are freely converted. FIG. 3 shows a state where a page 2 of the electronic book is displayed on the touch screen.

Figure 4:
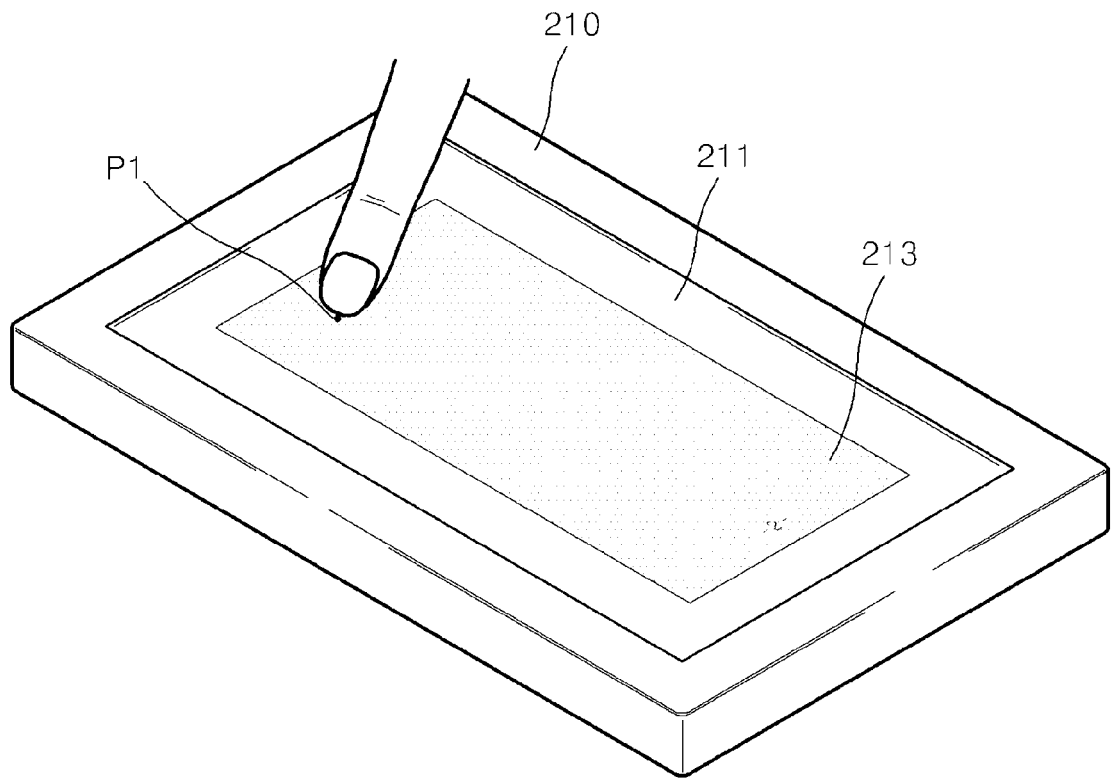

Referring to FIG. 4, the user performs the first touch at one spot P1 of the contents (that is, page 2 of the book). In FIG. 4, the first touch is one touch, but the first touch may be two or more of touch.

Figure 5:
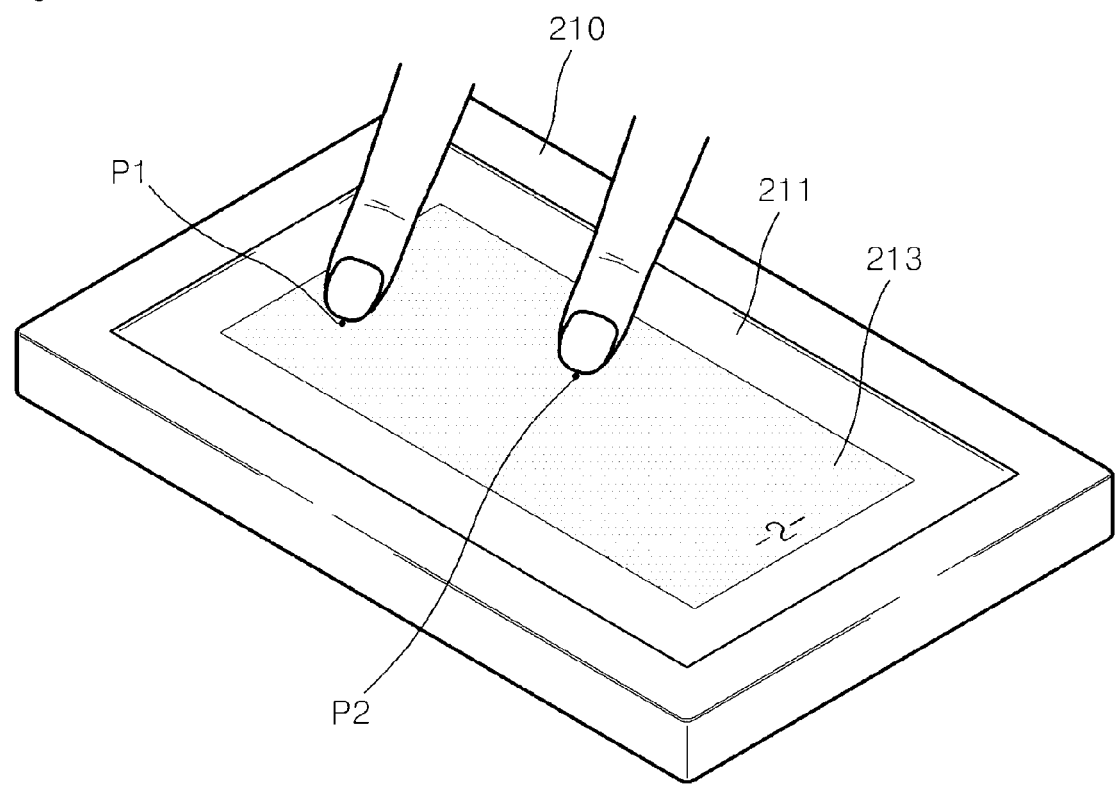

Referring to FIG. 5, the user performs the second touch at the other spot P2 of the page 2 of the electronic book. Accordingly, the touch screen according to the invention may be a multi-touch screen capable of substantially simultaneously detecting the first touch and the second touch.

Figure 6:
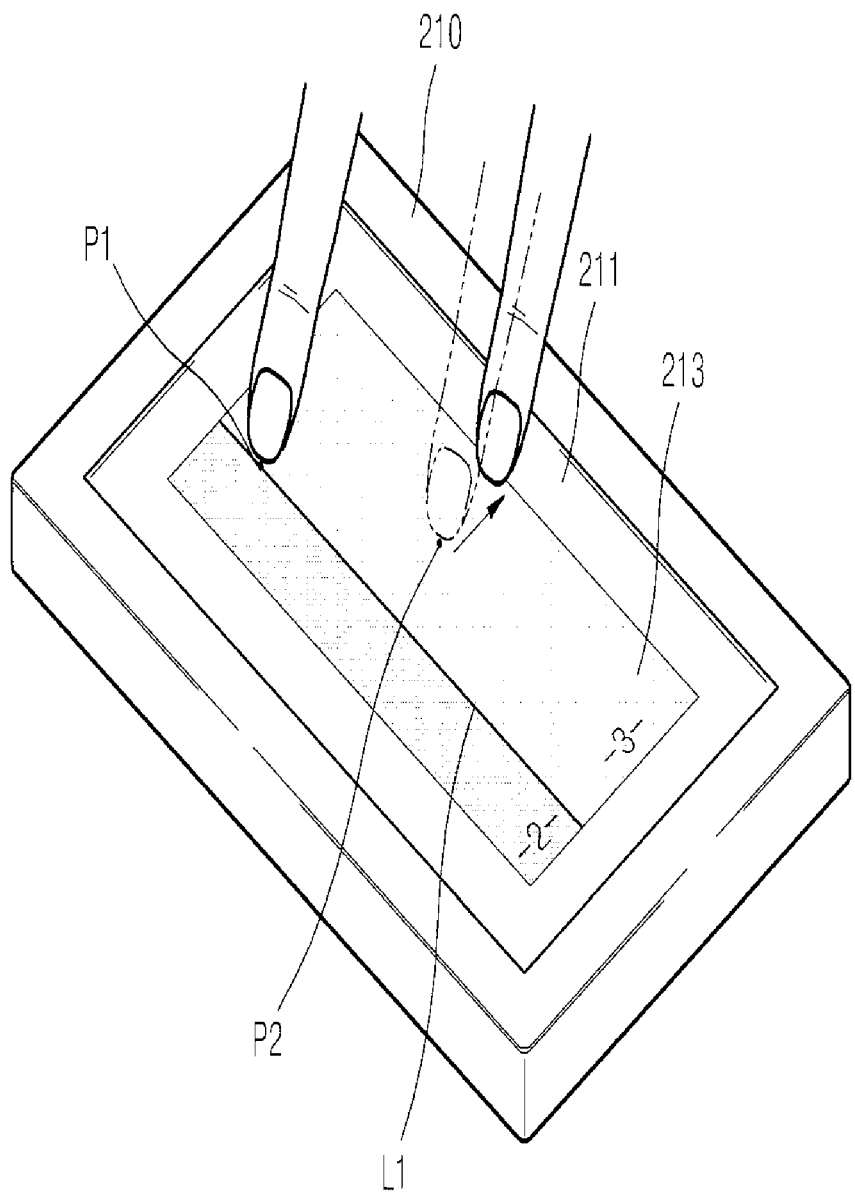

Referring to FIG. 6, a dragging gesture is performed from the second touch of the spot P2 to the right. Herein, the dragging gesture is a touch gesture in which touch input means such as a finger is moved with the touch state kept. According to the dragging from the spot P2 to the right, the page 2 displayed on the touch screen is converted into a page 3. However, the predetermined area of the page 2 set by the first touch of keeping the touch state is not converted yet. The non-converted contents area in an embodiment of the invention pass through the first touch position P1, and may be divided by a vertical line L1 vertically dividing the touch screen, as a boundary.

Again, referring to FIG. 6, the area opposite to the dragging direction on the basis of the L1 is kept in the page 2, but the area in the dragging direction on the basis of the L1 is converted into a page 3 by the dragging gesture performed from the second touch area. Accordingly, both of the page 2 and the page 3 are simultaneously displayed on the touch screen, and the user may refer to the fixed predetermined contents.

In the setting of the fixed area, the first content fixed area may be determined by cross lines vertically and horizontally dividing the first touch position P1, other than the vertical line vertically dividing the touch screen. In addition, the fixed area and the conversion area may be determined by a straight line connecting two touch spots, all of which belongs to the scope of the invention.

Figure 7:
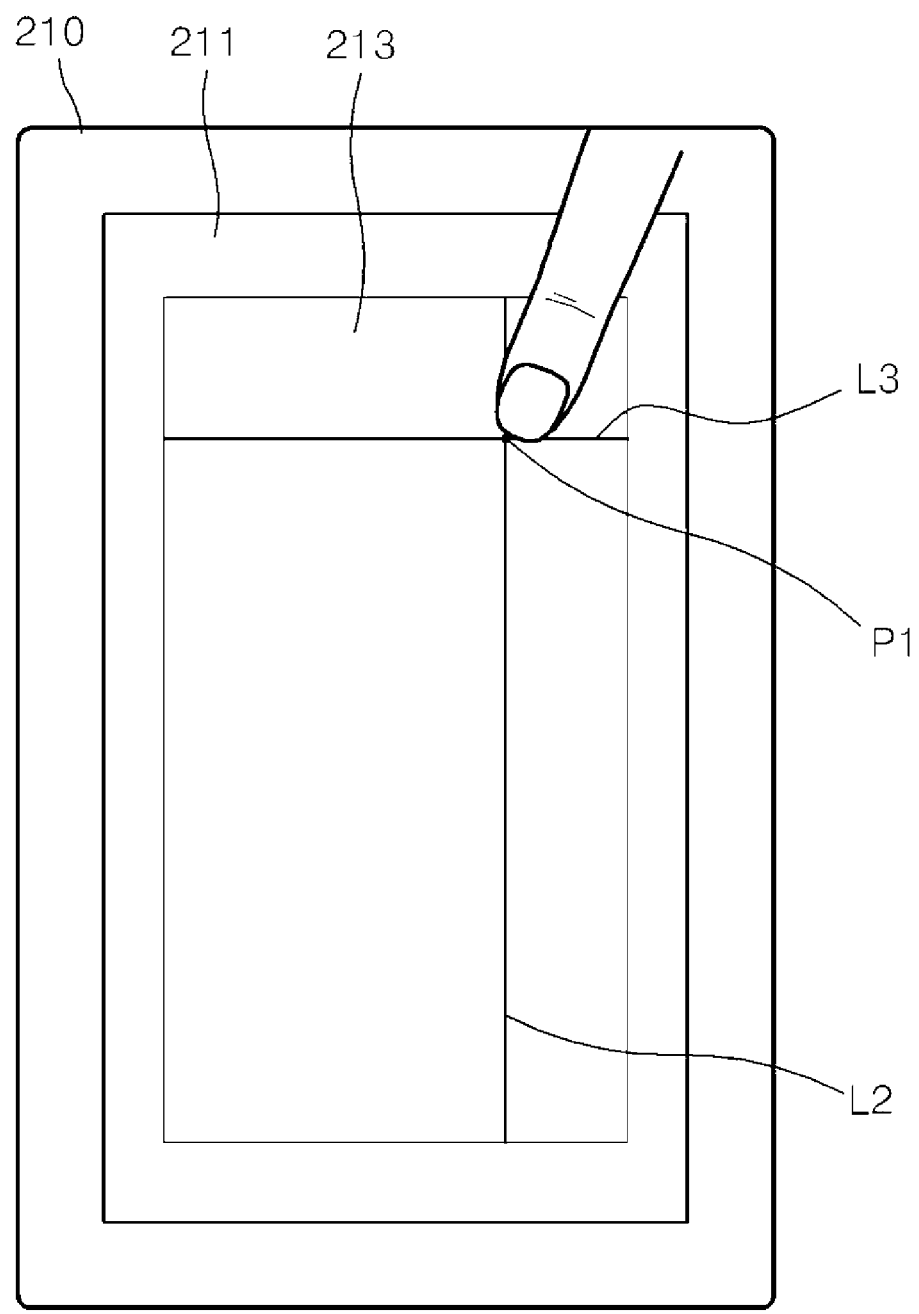
FIG. 7 to FIG. 9 are diagrams illustrating a method for controlling contents according to another embodiment of the invention.
Figure 8:
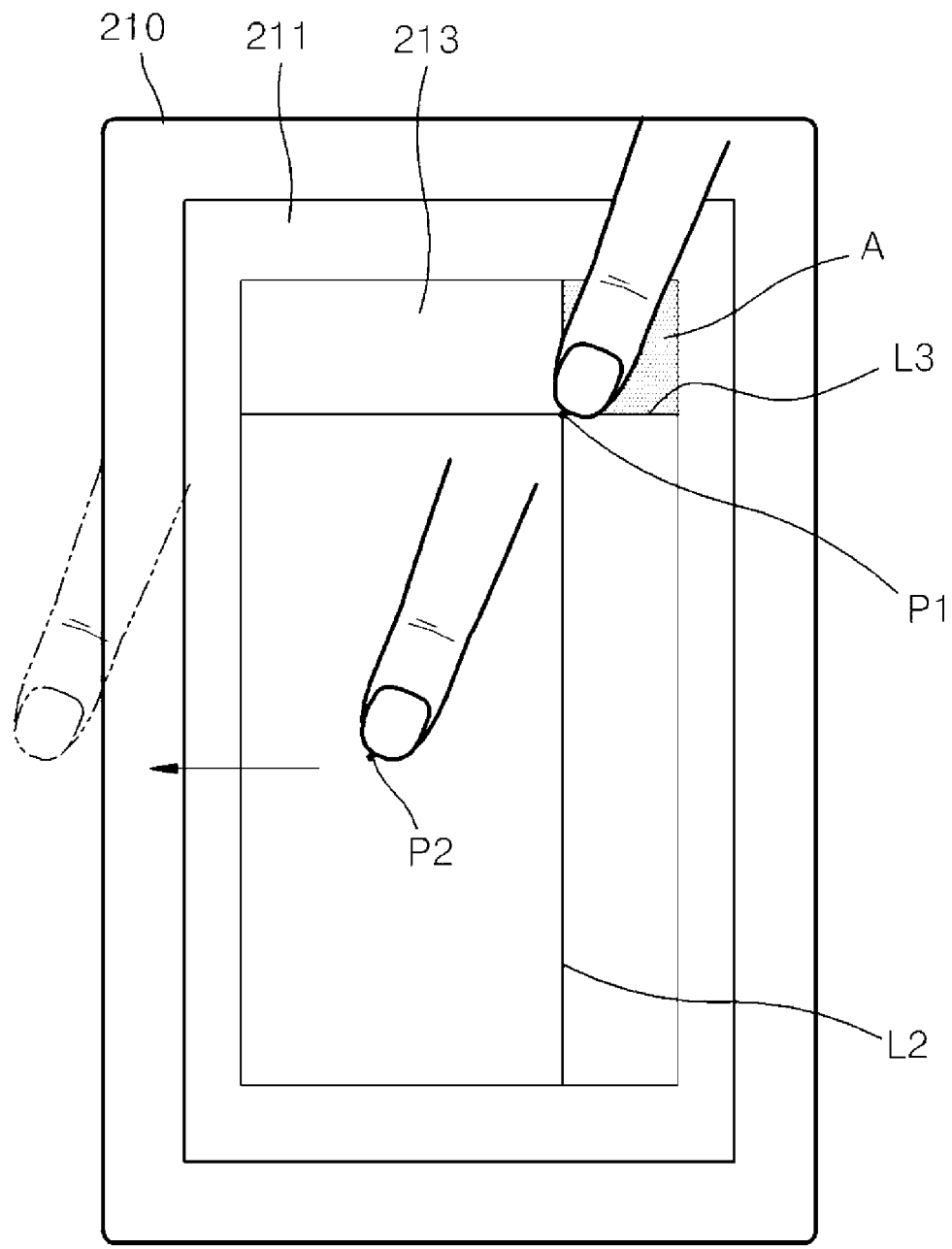
Figure 9:
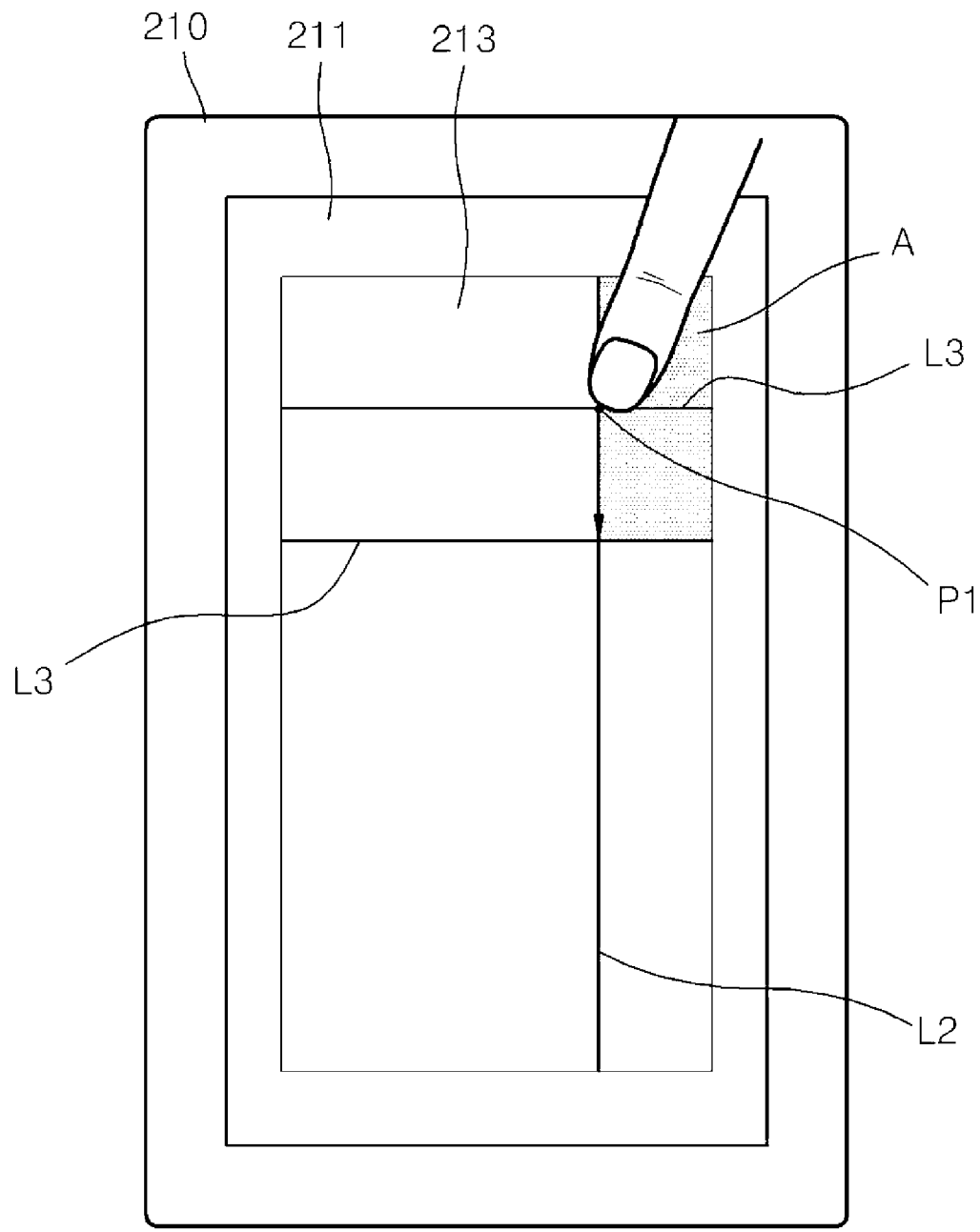

FIG. 7 to FIG. 9 are diagrams illustrating a method for controlling contents in which the fixed area is determined on the basis of the vertical and horizontal straight lines intersecting the first touch position according to another embodiment.

Referring to FIG. 7, two straight lines L2, L3 vertically intersecting on the basis of the first touch position P1 of the touch screen 211 are shown.

Referring to FIG. 8, dragging is performed at another spot P2 of the touch screen 211, and other contents are displayed on the touch screen by the dragging. However, in this case, the first contents area A in the direction opposite to the dragging direction on the basis of the vertically divided straight line L2 is in the fixed state.

Referring to FIG. 9, the horizontally divided straight line L1 is moved by dragging the first touch position P1, and the size of the first contents area A may be variably changed.

Meanwhile, the invention is to provide a device for controlling contents, in which contents fixed in spite of contents conversion and the area thereof are determined by touch of the user.

Figure 10:
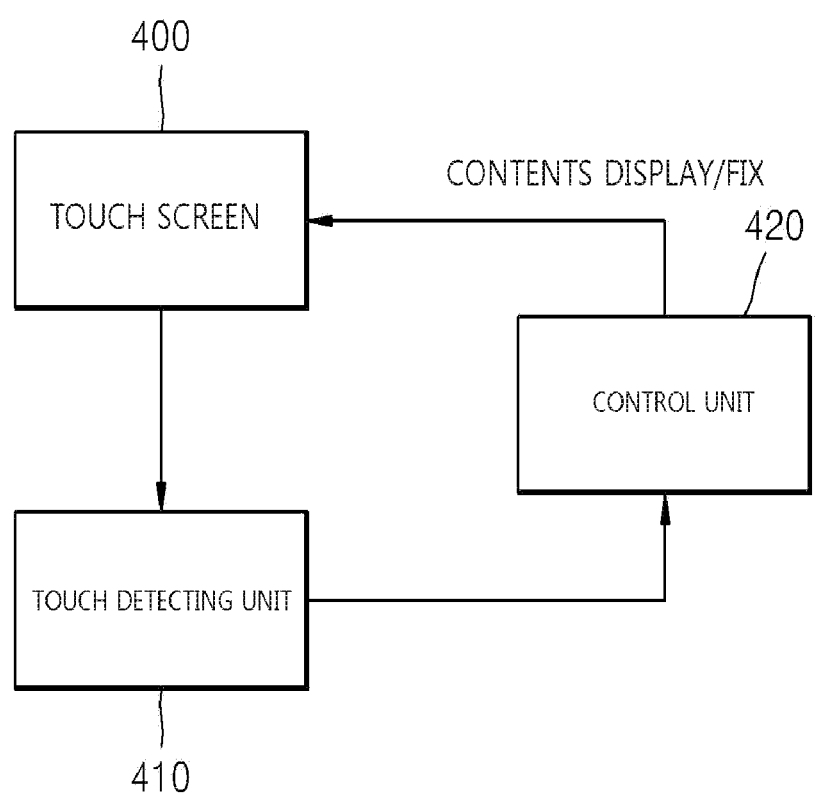
FIG. 10 is a block diagram illustrating a device for controlling contents of a user terminal according to an embodiment of the invention.

FIG. 10 is a block diagram illustrating a device for controlling contents of a user terminal according to an embodiment of the invention.

Referring to FIG. 10, the device for controlling contents of the user terminal includes a touch screen 400 on which the contents are displayed. The touch screen includes an arbitrary type of all touch screens capable of detecting single or multi-touch.

The control device includes a touch detecting unit 410 capable of detecting touch and a position thereof on the touch screen. The touch detecting unit may electrically detect contact of the touch screen of input means such as a finger of a user and a stylus pen, and a contact position thereof. The control device further includes a control unit 420 that converts the contents displayed on the touch screen 400 according to a predetermined event, and when touch is detected on the touch screen at the time of conversion in which the contents are changed on the display of the user terminal, the control unit fixes a part of the contents on the basis of the detected touch position. That is, in an embodiment of the invention, the control unit detects the touch position where the touch state is kept according to occurrence of the event of changing the contents, and performs a function of fixing a specific area of the contents including the detected touch position in spite of conversion.

In an embodiment of the invention, the predetermined event of changing the contents is the dragging gesture of moving the input means such as the finger with the touch state kept. In this case, the touch screen may be a multi-touch screen capable of substantially simultaneously detecting two or more of touch.

In addition, the control unit according to the invention has a configuration in which the touch (the first touch) of fixing a part of contents at the time conversion is movable, and the fixed contents area is variable, which is as described above.

In addition, the method and the device for controlling contents according to the invention may be embodied as computer readable codes on a computer recordable recording medium. The computer readable recording medium includes all kinds of recording devices in which computer system readable data is stored. An example of the recording medium may be a ROM, a RAM, an optical disk, a magnetic tape, a floppy disk, a hard disk, a nonvolatile memory, and the like, and a medium which is embodied in a type of carrier waves (for example, transmission through Internet) is included. In addition, in the computer readable recording medium, codes which are distributed in a computer system connected through a network and are readable by a computer in a distribution manner may be stored and executed. In addition, the invention includes the device for controlling a user terminal, and provides a user terminal in which contents of a touch screen of the terminal is controlled, and an example of the user terminal is as described above.

The invention has been described with reference to the embodiments shown in the drawings, but it is merely an example, it should be understood that a person skilled in the art may embody various modifications and other equivalent embodiments from this.

Accordingly, the real technical protective scope of the invention should be determined by the technical sprit of attached Claims.

INDUSTRIAL APPLICABILITY

The invention is applied to control contents utilization such as an e-book in a smart apparatus such as a smart phone and a smart pad.

The invention claimed is:

1. A method for controlling contents of a user terminal provided with a touch screen on which contents are sequentially displayed, the method comprising:
   detecting first touch on a touch screen on which first contents are displayed;
   detecting second touch in a touch screen area other than the detected first touch position;
   converting the first contents into second contents by a second touch gesture from the second touch; and
   displaying the contents converted by the second touch gesture on the full touch screen according to release of the first touch, or the contents fixed by the first touch gesture on the full touch screen according to release of the second touch,
   wherein a predetermined area of the first contents is not converted by the first touch with the touch state kept in the contents conversion based on the second touch,
   wherein the size of the predetermined area of the first contents is to be continuously variably changed according to dragging of the first touch position,
   wherein the boundary of the predetermined area of the contents which is not converted is determined by a vertical or horizontal line which divides vertically or horizontally the touch screen at the touch screen position where the first touch is detected, wherein the vertical or horizontal line includes the point corresponding to the position where the first touch is detected.

2. The method for controlling contents of a user terminal according to claim 1, wherein the first touch is one or more.

3. The method for controlling contents of a user terminal according to claim 1, wherein the predetermined area of the contents which are not converted includes the first touch detection position.

4. The method for controlling contents of a user terminal according to claim 1, wherein the first touch is movable by a user, and a size of the predetermined area of the contents which are not converted is variable.

5. The method for controlling contents of a user terminal according to claim 1, wherein the contents converted by the second touch gesture are fully displayed on the touch screen according to release of the first touch.

6. The method for controlling contents of a user terminal according to claim 1, wherein the contents fixed by the first touch gesture are fully displayed on the touch screen according to release of the second touch.

7. The method for controlling contents of a user terminal according to claim 3, wherein the contents converted by the second touch gesture are fully displayed on the touch screen according to release of the first touch.

8. The method for controlling contents of a user terminal according to claim 3, wherein the contents fixed by the first touch gesture are fully displayed on the touch screen according to release of the second touch.

9. A device for controlling contents of a user terminal, comprising:
   a touch screen on which the contents are displayed;
   a touch detecting unit that detects touch on the touch screen and a position thereof; and
   a control unit that converts the contents displayed on the touch screen according to a predetermined event,
   wherein the control unit detects a first touch on a touch screen on which first contents are displayed, detects a second touch in a touch screen area other than the detected first touch position, converts the first contents into second contents by a second touch gesture from the second touch, and displays the contents converted by the second touch gesture on the full touch screen according to release of the first touch, or the contents fixed by the first touch gesture on the full touch screen according to release of the second touch,
   wherein a predetermined area of the first contents is not converted by the first touch with the touch state kept in the contents conversion based on the second touch,
   wherein the size of the predetermined area of the first contents is to be continuously variably changed according to dragging of the first touch position, wherein the boundary of the predetermined area of the contents which is not converted is determined by a vertical or horizontal line which divides vertically or horizontally the touch screen at the touch screen position where the first touch is detected, wherein the vertical or horizontal line includes the point corresponding to the position where the first touch is detected.

10. The device for controlling content of a user terminal according to claim 9, wherein the predetermined event is a touch-dragging gesture.

11. The device for controlling content of a user terminal according to claim 10, wherein the touch detecting unit simultaneously detects two or more of touch on the touch screen.

12. The device for controlling content of a user terminal according to claim 11, wherein the touch which fixes a part of the contents at the time of conversion is movable, and the fixed contents area is variable.

13. The device for controlling content of a user terminal according to claim 9, wherein the touch detecting unit simultaneously detects two or more of touch on the touch screen.

14. The device for controlling content of a user terminal according to claim 9, wherein the touch which fixes a part of the contents at the time of conversion is movable, and the fixed contents area is variable.

15. The device for controlling content of a user terminal according to claim 10, wherein the touch which fixes a part of the contents at the time of conversion is movable, and the fixed contents area is variable.

* * * * *